United States Patent [15] 3,656,109

Conway [45] Apr. 11, 1972

[54] HAMMING DISTANCE AND MAGNITUDE DETECTOR AND COMPARATOR

[72] Inventor: Patrick H. Conway, Minneapolis, Minn.

[73] Assignee: Sperry Rand Corporation, New York, N.Y.

[22] Filed: Mar. 13, 1970

[21] Appl. No.: 19,176

[52] U.S. Cl. ..........................340/146.2, 235/177, 340/146.1
[51] Int. Cl. ........................................G06f 7/02, G06f 7/385
[58] Field of Search ..................179/15 BA, 15 BS; 178/69.5; 340/146.2, 146.1; 235/177

[56] References Cited

UNITED STATES PATENTS

| | | | |
|---|---|---|---|
| 3,490,000 | 1/1970 | Dawson | 340/146.2 |
| 3,350,685 | 10/1967 | Lindaman | 340/146.2 |
| 3,251,035 | 5/1966 | Weinstein | 340/146.2 |
| 2,923,476 | 2/1960 | Ketchledge | 340/146.2 X |

*Primary Examiner*—Malcolm A. Morrison
*Assistant Examiner*—James F. Gottman
*Attorney*—Thomas J. Nikolai, Kenneth T. Grace and John P. Dority

[57] ABSTRACT

The specification describes the design for a Hamming distance and magnitude detector as well as a Hamming magnitude comparator, each implemented with conventional boolean logic devices operating in a parallel manner.

4 Claims, 2 Drawing Figures

INVENTOR
PATRICK H. CONWAY
BY Thomas J. Nikolai
ATTORNEY

HAMMING DISTANCE AND MAGNITUDE DETECTOR AND COMPARATOR

BACKGROUND OF THE INVENTION

The Hamming distance between two binary words is defined as the number of unlike bits in the two words. The Hamming magnitude of a binary word is defined as the number of binary ones contained in the word and is oftentimes referred as the Hamming distance of the word from zero. A Hamming magnitude comparator is a device for determining which of two binary words has the most one signals or if they have an equal number.

As is fully explained in an article by R. W. Hamming entitled "Error Detecting and Correcting Codes" published in the Bell System Technical Journal, vol. XVI, No. 2, pp. 147–160, Apr., 1950, devices of the type described herein find application in communication systems for detecting and correcting transmission errors. Similarly, in pulse code modulation telemetry systems, each frame of data is preceded by a frame sync word. Incoming serial data is applied to a shift register, and the contents of the shift register are compared to the sync word during each bit time of the incoming message. The beginning of a frame is indicated by agreement between the frame sync word and the contents of the shift register. In practice, it is unnecessary to have 100 percent agreement between the sync word and the incoming data for an "in-sync" indication due to probability of error in the data reconstruction. For example, if five bits of a seven bit sync word or 25 bits of a 31 bit sync word agree, a high probability of synchronization exists. Thus, a Hamming distance of zero between the sync word and the shift register contents indicates an extremely high probability of synchronization while a Hamming distance of one, two or three indicates progressively lower probability. Thus, devices of the type described herein are well suited to application in pulse code modulation communication systems.

In generating a signal representative of a comparison of the Hamming magnitude of two binary words, conventional prior art devices would first serialize each of the words to be compared. Next, the serialized words would be transmitted to a one's counter where the number of ones contained in each word would be counted and the result numerically compared. Devices of this type require a relatively large amount of hardware to implement and consume a relatively long period of time in generating a signal representative of the comparison.

The Lindaman U.S. Pat. No. 3,350,685 describes an alternate prior art arrangement for providing Hamming magnitude comparison. The apparatus described in the Lindaman patent employs majority logic in its implementation. While the Lindaman invention constitutes a distinct advantage over serial prior art techniques in terms of reduced circuit complexity and increased operational speed, it only provides a quantitative magnitude comparison, but does not give the actual value of the Hamming distance. Thus, it provides a "greater than," "equal to" or "less than" indication, but does not provide a numerical indication as to the degree of difference.

The present invention is felt to be an improvement over the Hamming magnitude comparators of the prior art in that it requires substantially less circuitry in its implementation than is required by either the serial counting technique or the majority decision logic approach. Also, the implementation of the present invention provides an increase in speed of operation over the majority decision logic implementation in that fewer logic levels are required. Further, the circuit of the present invention provides not only an indication that the Hamming magnitude of a first word is greater than, equal to or less than the Hamming magnitude of a second word, but also a numerical indication as to the degree of difference.

Accordingly, it is an object of the present invention to provide a new and improved Hamming distance and magnitude detector and Hamming magnitude comparator which utilizes conventional boolean logic elements and which operates in parallel fashion.

This and other objects of the invention as well as other novel features which are considered characteristic of the invention are set forth with particularity in the appended claims. The invention itself, both as to its organization and method of operation, will best be understood from the following description when read in connection with the accompanying drawings, in which:

Figure 1:
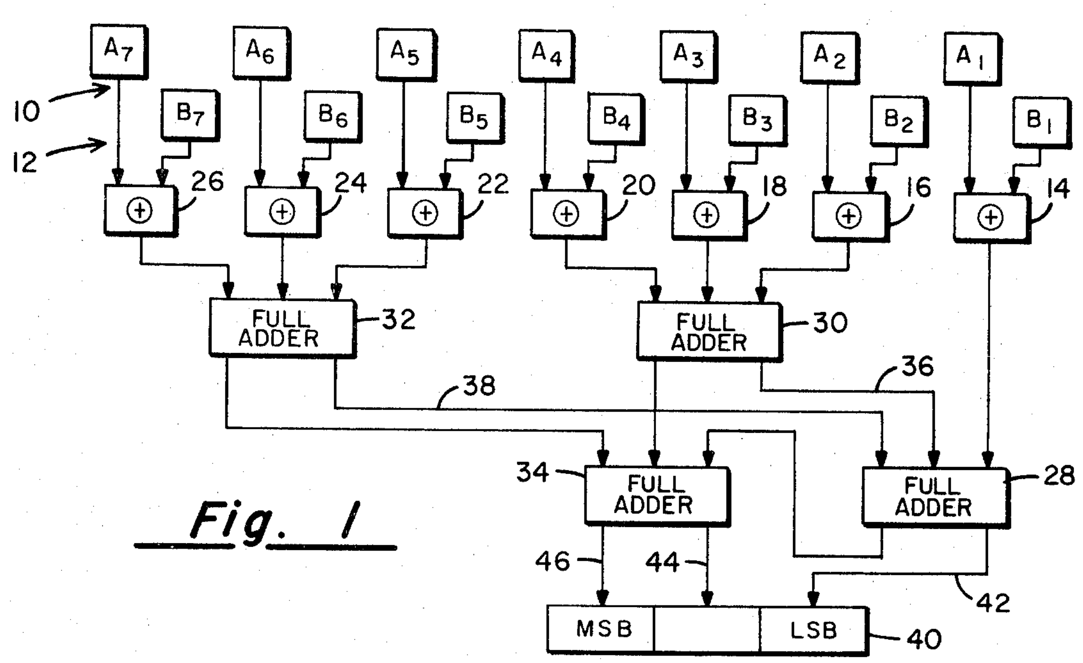
FIG. 1 illustrates by means of a logical block diagram the design of a Hamming distance or Hamming magnitude detector constructed in accordance with the present invention.

Referring now to FIG. 1, there is shown a first register indicated generally by numeral 10 which comprises a plurality of stages $A_1$ through $A_7$. This may be a conventional binary register made up of interconnected flip-flops and need not have shifting properties. Likewise, there is provided a second register indicated generally by the numeral 12 which also is comprised of a plurality of stages $B_1$ through $B_7$. Registers 10 and 12 are designed to store (at least temporarily) two binary words. When functioning as a Hamming distance detector, registers 10 and 12 contain two binary words such that the number of unlike bits between the two words can be determined. When functioning as a Hamming magnitude detector, however, one of the registers 10 of 12 will store all zeros.

Corresponding stages of each register provide an output to a plurality of conventional Exclusive OR logic circuits 14 through 26. More particularly, stages $A_1$ and $B_1$ of registers 10 and 12 are coupled to the input terminals of Exclusive OR circuit 14, stages $A_2$ and $B_2$ are coupled to the input terminals of Exclusive OR circuit 16, etc. As is well known in the art, an Exclusive OR logic circuit provides a "1" signal at its output only when the inputs thereto are differing. As long as the inputs to an Exclusive OR circuit are the same, the output will be "0".

The outputs from the Exclusive OR circuits 14 through 26 are coupled into an adding means including a plurality of Full Adders 28, 30, 32, and 34. A Full Adder is a logic circuit which accepts as inputs first and second binary signals representative of an addend and an augend bit along with a third signal representative of a carry signal from a lower ordered stage and combines these three signals to form a binary signal representing the sum of the input signals and a carry signal for a next higher ordered stage.

As is illustrated in FIG. 1, the output from Exclusive OR 14 is connected to a first input terminal of Full Adder 28. Exclusive OR circuits 16, 18 and 20 have their outputs coupled to the three input terminals of Full Adder 30 while Exclusive OR circuits 22, 24, and 26 are connected to the input terminals of Full Adder 32. The "sum" output terminal of Full Adder 30 is connected by a conductor 36 to a second input terminal of Full Adder 28. Similiarly, the "sum" output terminal of Full Adder 32 is connected by conductor 38 to the third input terminal of Full Adder 28. Full Adder 34 receives as its inputs the "carry" output from Full Adders 28, 30 and 32.

In order to temporarily store a number representing the Hamming distance between the binary values stored in registers 10 and 12 there is provided an output register 40, here shown as including three stages. The input to the least significant bit stage comes from the "sum" output of Full Adder 28 by way of conductor 42. A conductor 44 connects the "sum" output terminal of Full Adder 34 to the next most significant bit position in register 40 while the "carry" output terminal of Full Adder 34 is connected by conductor 46 to the most significant bit position of output register 40.

OPERATION

Now that the elements comprising the Hamming distance detector of this invention and their mode of interconnection has been described in detail, consideration will be given to the operation. As was mentioned in the introductory portion of this specification, a Hamming distance detector is a device which determines the number of unlike bits in two binary words. The words to be compared are initially loaded into the input registers 10 and 12. If the inputs to any of the Exclusive OR circuits 14 through 26 are different, the Exclusive OR circuits will produce a logical "1" output signal which will be applied to an input terminal of a Full Adder stage 28 through 34. On the other hand, if both inputs to an Exclusive OR circuit are identical, a logical "0" signal will be applied as an input to a corresponding Full Adder stage. The adding network functions to sum up the Exclusive OR logical "1" output signals and to store this total in the output register 40.

To more fully describe the operation of the Hamming distance detector, let it be assumed that the binary number 1000011(decimal 67) is loaded into input register 10 while the binary number 1010101(decimal 85) is loaded into input register 12. An examination of these two input numbers shows the they differ from one another in three bit positions. Specifically, bit positions 2, 3 and 5 of registers 10 and 12 having differing digits stored therein. Hence, only Exclusive OR circuit 16, 18 and 22 will be producing logical "1" output signals. Exclusive OR circuits 14, 20, 24 and 26 will all output logical "0" signals. Full Adder 30 will receive as inputs, then, two logical "1" signals and a "0" signal and will generate a "0" signal at its "sum" output terminal and a "1" signal at its "carry" output terminal. Full Adder 32, on the other hand, receives only a signal logical "1" input such that only its sum output terminal will be at the logical "1" level.

Under the assumed conditions, Full Adder 28 will only receive a single logical "1" input (the sum output from Full Adder 32) and, hence, a logical "1" signal will appear on the conductor 42 and will be stored in the least significant bit position of the output register 40. Full Adder 34 also receives only a single logical "1" input (from the "carry" output of Full Adder 30) so that its "sum" output terminal 44 will apply a logical "1" into the next to the least significant bit position in output register 40. Because Full Adder 34 only had a single logical "1" input, the output appearing on conductor 46 will be a logical "0" signal. Thus, it can be seen that the contents of the output register will be 011(decimal 3) which indicates that the contents of the input registers 10 and 12 differed in three bit positions.

The arrangement shown in FIG. 1 illustrates a Hamming distance detector for comparing two seven bit words. It is believed to be within the realm of ordinary skill in the art for one to expand the network to accommodate input words of larger size having seen the manner in which the seven stage embodiment is arranged.

The apparatus shown in FIG. 1 can also be used as a Hamming magnitude detector if the contents of one of the input registers 10 or 12 is set to all zeros. Thus, an input word in one of the registers 10 or 12 will be compared against zero and the output register 40 will be made to contain a number representing the number of bit positions in the input word which are unequal to zero.

HAMING MAGNITUDE COMPARATOR

Figure 2:
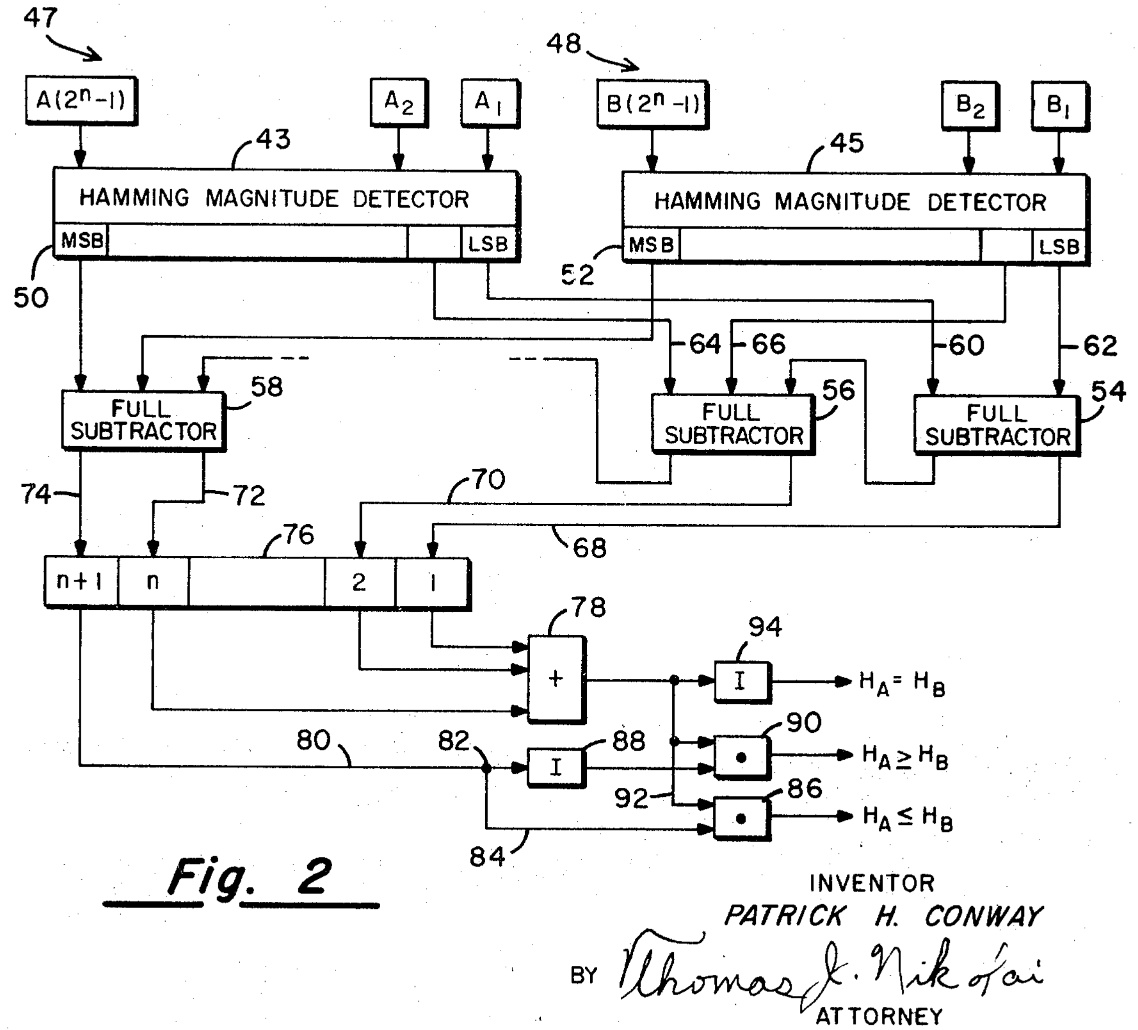
FIG. 2 illustrates by means of a logical block diagram the preferred embodiment of a Hamming magnitude comparator.

FIG. 2 illustrates the manner in which two Hamming magnitude detectors of the type shown in FIG. 1 can be interconnected with subtracting means in the implementation of a Hamming magnitude comparator. Referring to FIG. 2, there is shown a pair of Hamming magnitude detectors 43 and 45 each of which may be identical to the structure shown in FIG. 1. Because in a Hamming magnitude detector one of the input words to be examined is all zeros, only a single input register is associated with each of the Hamming magnitude detectors 43 and 45. Specifically, an input register 47 is associated with Hamming magnitude detector 43 and an input register 48 is associated with Hamming magnitude detector 45. As in FIG. 1, each of the Hamming magnitude detectors is provided with an output register 50 and 52. These correspond to the output register 40 in FIG. 1.

In order to determine the difference between the Hamming magnitudes of the two numbers inserted into the input registers 47 and 48, subtracting means are provided and receive as inputs the contents of the output registers 50 and 52 of the Hamming magnitude detectors 43 and 45. Correspondingly aligned stages of the output register 50 and 52 are coupled to first and second inputs of an array of Full Subtractor networks 54, 56 . . . 58. More specifically, the least significant bit stage of output registers 50 and 52 are coupled by conductors 60 and 62 to the two input terminals of Full Subtractor 54. Similarly, the next least significant digits in registers 50 and 52 are coupled by conductors 54 and 56 to two of the input terminals of Full Subtractor 56. The third input terminal of Full Subtractor 56 is connected to the "borrow" terminal of subtractor 54. While not specifically illustrated, additional Full Subtractors are connected to the remaining bit stages of output registers 50 and 52 with the third input to the Full Subtractor coming from the next lower ordered Full Subtractor borrowed terminal.

The "difference" output terminal of the Full Subtractors 54, 56 . . . 58 are coupled by conductors 68, 70, 72 and 74 to individual stages of the Hamming Magnitude Comparator output register 76. As is illustrated, the Full Subtractor 54 associated with the least significant bit position of the output registers 50 and 52 provides an output to the least significant bit position of the output register 76 by way of conductor 68. The Full Subtractor 56 associated with the nest most significant digit position in output registers 50 and 52 has its "difference" terminal connected by conductor 70 to the next most significant digit position of output register 76. Finally, the Full Subtractor 58 associated with the most significant digit position of registers 50 and 52 has its "borrow" terminal connected to the most significant digit position stage of output register 76 and its "difference" output terminal, connected by conductor 72 to the next to the most significant digit position of output register 76.

The outputs from each of the stages of the output register 76 (except the most significant digit position) are coupled as inputs to an OR circuit 78. The most significant stage of the output register 76, however, is coupled by way of a conductor 80 to a junction point 82. The junction 82 is connected by a conductor 84 to a first input terminal of an AND circuit 86. Junction 82 is also coupled through an inverter 88 to a first input terminal of an AND gate 90. The second input for gates 86 and 90 comes from the output of OR circuits 78 by way of a conductor 92. Finally, the output from OR circuit 78 is connected to a inverter 94.

A "1" signal appearing at the output of inverter 94 provides an indication that the Hamming magnitude of the number in register 50 is equal to the Hamming magnitude stored in register 52. A "1" signal appearing at the output from gate 90 is indicative of the fact that the Hamming magnitude stored in register 50 is greater than the Hamming magnitude stored in register 52. A "1" signal appearing at the output of AND gate 86 indicates that the Hamming magnitude stored in register 50 is less than that stored in register 52.

OPERATION - HAMMING MAGNITUDE COMPARATOR

Now that the circuit components and interconnections for the Hamming magnitude comparator have been described in detail, consideration will be given to the mode of operation.

In the first instance, the two binary quantities whose Hamming magnitudes are to be compared are loaded into the input registers 47 and 48 respectively. As was mentioned above, it is unnecessary to provide a second input register for each of the Hamming magnitude detectors 43 and 45 since, by definition, the second input to the Exclusive OR logic circuit (FIG. 1) are all logical "0" signals. After being operated upon by the Exclusive OR logic circuits and the Full Adder circuits of FIG. 1, there will be inserted into the output registers 50 and 52 a number indicative of the Hamming magnitude of the two numbers originally inserted in input registers 47 and 48.

The contents of the output registers 50 and 52 are applied as inputs to a subtraction network including the Full Subtractors 54, 56 . . . 58 such that a binary number is developed on the output lines 68, 70, 72 and 74 indicative of the difference between the quantities stored in registers 50 and 52. If upon subtraction, a "borrow" signal is developed on the conductor 64 from the Full Subtractor 58, it is stored in the most significant bit position of the output register 76. A one signal in this bit position indicates that the subtrahend was greater than the minuend and only gate 86 will be fully enabled to provide the indication of this fact.

If the contents of the highest order stage is a "0", this signal will be inverted by circuit 88 so that gate 90 will be fully enabled thereby indicating that the contents of output register 50 was greater than the contents of output register 52. If the contents of registers 50 and 52 are equal, register 76 will contain all zeros so that OR circuit 78 will output a "0" to inverter 94. The resulting logical "1" signal at the output of inverter 94 is indicative of equality between the contents of the register 50 and 52. The value of the Hamming difference appears in the output register 76 at the conclusion of the subtract operation.

Thus it can be seen that there is provided by this invention a device which operates in a parallel fashion to generate a Hamming magnitude comparison between two input quantities and which utilizes conventional binary logic components throughout.

It is understood that suitable modification may be made in the structure as disclosed provided such modification comes within the spirit and scope of the appended claims.

Having now, therefore, fully illustrated and described my invention, what I claim to be new and desire to protect by Letters Patent is:

1. A circuit for generating a digital quantity representing the Hamming distance between two multi-bit binary coded words comprising:

first and second *n*-state registers for storing the binary coded words to be examined;

*n*-Exclusive OR logic circuits having a pair of input terminals and an output terminal;

means connecting an output terminal of corresponding ones of said *n*-stages of said first and second registers individually to said pair of input terminals on said *n*-Exclusive OR logic circuits;

full adder means connected to said output terminals of said *n*-Exclusive OR logic circuits for summing the total number of output signals from said Exclusive OR logic circuit; and output register means connected to said full adder means for at least temporarily storing the output from said full adder means representing the number of unlike bits in said two words.

2. Apparatus for comparing the Hamming magnitude of two *n*-bit binary words comprising:

a. a pair of Hamming Magnitude Detectors each including
   1. *n*-Exclusive OR logic circuits having first and second input terminals and an output terminal;
   2. an *n*-stage register for storing a binary word;
   3. means connecting the output of each of said *n*-stages individually to said *n*-Exclusive OR logic circuits and signals representing binary 0's to the second input terminal of each of said *n*-Exclusive OR logic circuits;
   4. full adder means connected to said output terminals of said *n*-Exclusive OR logic circuits for summing the output signals from said Exclusive OR logic circuits; and
   5. output register means connected to said full adder means for at least temporarily storing the output from said full adder means representing the number of binary 1 signals stored in said *n*-stage register;

b. subtracting means connected to the output of said output register means of said pair of Hamming Magnitude Detectors for forming a binary number representing the algebraic difference between the signals representing the Hamming magnitudes stored in said output register means.

3. Apparatus as in claim 2 wherein said subtracting means comprises a plurality of full subtractor stages each adapted to receive a minuend digit from the output register means of a first of said pair of Hamming Magnitude Detectors, a subtrahend digit from the output register of the second of said pair of Hamming Magnitude Detectors and a borrow digit from the next lower order full subtractor state.

4. Apparatus as in claim 2 and further including comparator means coupled to the output of said subtracting means for indicating whether the binary number representing the Hamming Magnitude of said one of said two *n*-bit binary numbers is greater than, equal to or less than the Hamming Magnitude of the others of said two *n*-bit binary numbers.

* * * * *

UNITED STATES PATENT OFFICE
CERTIFICATE OF CORRECTION

Patent No. 3,656,109 Dated April 11, 1972

Inventor(s) Patrick H. Conway

It is certified that error appears in the above-identified patent and that said Letters Patent are hereby corrected as shown below:

Column 5, line 36, after "second", "n-state" should read -- n-stage --.

Signed and sealed this 7th day of November 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O - 366-334